US012772328B2

(12) United States Patent
Han et al.

(10) Patent No.: US 12,772,328 B2
(45) Date of Patent: Oct. 20, 2026

(54) METHOD AND APPARATUS FOR SIDELINK COMMUNICATION

(71) Applicant: Lenovo (Beijing) Limited, Beijing (CN)

(72) Inventors: Jing Han, Beijing (CN); Congchi Zhang, Shanghai (CN); Ran Yue, Beijing (CN); Mingzeng Dai, Shanghai (CN); Lianhai Wu, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 238 days.

(21) Appl. No.: 18/283,973

(22) PCT Filed: Apr. 1, 2021

(86) PCT No.: PCT/CN2021/085013
§ 371 (c)(1),
(2) Date: Sep. 25, 2023

(87) PCT Pub. No.: WO2022/205335
PCT Pub. Date: Oct. 6, 2022

(65) Prior Publication Data

US 2024/0163963 A1 May 16, 2024

(51) Int. Cl.
*H04W 76/28* (2018.01)
*H04W 72/25* (2023.01)
*H04W 80/02* (2009.01)

(52) U.S. Cl.
CPC ........... *H04W 76/28* (2018.02); *H04W 72/25* (2023.01); *H04W 80/02* (2013.01)

(58) Field of Classification Search
CPC ...... H04W 76/28; H04W 72/25; H04W 80/02
(Continued)

(56) References Cited

U.S. PATENT DOCUMENTS 12,082,243 B2 * 9/2024 Zhang .................. H04W 74/04

FOREIGN PATENT DOCUMENTS

| | | | |
|---|---|---|---|
| CN | 111800894 | A | 10/2020 |
| JP | 2024501702 | A | 1/2024 |
| WO | 2021052424 | A1 | 3/2021 |

OTHER PUBLICATIONS

R2-2100515 (Year: 2021).*
(Continued)

*Primary Examiner* — Intekhaab A Siddiquee
(74) *Attorney, Agent, or Firm* — FIG. 1 Patents

(57) ABSTRACT

Embodiments of the present application relate to methods and apparatuses for sidelink (SL) communication. According to an embodiment of the present application, a method may include: obtaining, by a remote device, a plurality of SL DRX configurations for SL communication; determining, by the remote device, one or more SL DRX configurations from the plurality of SL DRX configurations for a medium access control (MAC) layer of the remote device; and in the case that there is SL data associated with DRX in the remote device, transmitting the SL data from the remote device based on active time derived in each of the one or more SL DRX configurations. Embodiments of the present application determine three kinds of granularity for SL DRX configuration for broadcast and groupcast communication and propose how to determine SL DRX configuration for three kinds of granularity.

20 Claims, 3 Drawing Sheets

(58) Field of Classification Search
USPC .......................................................... 370/311
See application file for complete search history.

(56) References Cited

OTHER PUBLICATIONS 62992674P (Year: 2021).*
"Foreign Office Action", JP Application No. 2023560692, May 7, 2025, 10 pages.
ITL, "View on Resource Selection in Mode 2", 3GPP TSG-RAN WG2 Meeting #113, R2-2101869, Jan. 2021, 4 pages.
"Extended European Search Report", EP Application No. 21933993.4, Nov. 22, 2024, 12 pages.
"Study on system enhancement for Proximity based Services (ProSe) in the 5G System (5GS) (Release 17)", TR 23.752 V0.5.1, 3rd Generation Partnership Project; Technical Specification Group Services and System Aspects, Oct. 2020, 162 pages.
Huawei, et al., "Consideration on sidelink DRX for broadcast and groupcast", 3GPP TSG-RAN WG2 Meeting #115-e, R2-2107155, Online, Aug. 2021, 5 pages.
ZTE Corporation, et al., "Discussion on principle for Sidelink DRX", 3GPP TSG-RAN WG2 Meeting #113 electronic, R2-2100496, Online, Jan. 2021, 5 pages.
Huawei , et al., "Consideration on the sidelink DRX for unicast, groupcast and broadcast", 3GPP TSG-RAN WG2 Meeting #112 electronic, R2-2009413 [retrieved Nov. 30, 2023]. Retrieved from the Internet <https://www.3gpp.org/ftp/TSG_RAN/WG2_RL2/TSGR2_112-e/Docs>, Nov. 2020, 8 pages.
Interdigital Inc. , "Procedures for Handling the DRX Configuration", 3GPP RAN WG2 Meeting #113 electronic, R2-2100515, Online [retrieved Nov. 30, 2023]. Retrieved from the Internet <https://www.3gpp.org/ftp/tsg_ran/WG2_RL2/TSGR2_113-e/Docs>, Jan. 2021, 4 pages.
PCT/CN2021/085013 , "International Preliminary Report on Patentability", PCT Application No. PCT/CN2021/085013, Oct. 12, 2023, 6 pages.
PCT/CN2021/085013 , "International Search Report and Written Opinion", PCT Application No. PCT/CN2021/085013, Dec. 31, 2021, 7 pages.
Foreign Intention to Grant issued in JP application No. 2023-560692, mailed Oct. 24, 2025, 5 pages.
Foreign Office Action issued in KR 2023-7037199, mailed Jul. 21, 2026, 13 pages.

* cited by examiner

METHOD AND APPARATUS FOR SIDELINK COMMUNICATION

TECHNICAL FIELD

Embodiments of the present application generally relate to wireless communication technology, especially to a method and apparatus for sidelink (SL) communication.

BACKGROUND

Discontinuous reception (DRX) refers to a working mode for saving power consumption of a user equipment (UE). For example, generally, in the DRX mode, the UE alternates between an active state and a sleep state (or an inactive state). The UE only turns on the receiver to monitor and receive control information or data when it is in the active state, and turns off the receiver to stop receiving the control information or data When it is in the sleep state.

In RAN #86 meeting, a sidelink enhancement work item was agreed. The sidelink enhancement work item introduced SL DRX and specified a mechanism aiming to align SL DRX among UEs. In RAN2 #113e, it was agreed that for groupcast and broadcast communication in sidelink, the SL DRX configuration requires more granularity than the cast type.

Given this, how to determine the granularity of the SL DRX configuration for groupcast and broadcast communication and how to determine SL DRX configurations for different kinds of granularity needs to be discussed.

SUMMARY OF THE APPLICATION

Embodiments of the present application at least provide a technical solution for SL communication, which proposes three kinds of granularity of SL DRX configuration for broadcast and groupcast communication and also proposes how to determine SL DRX configuration in view of the three kinds of granularity.

According to some embodiments of the present application, a method for wireless communication may include: obtaining, by a remote device, a plurality of SL DRX configurations for SL communication; determining, by the remote device, one or more SL DRX configurations from the plurality of SL DRX configurations for a medium access control (MAC) layer of the remote device; and in the case that there is SL data associated with DRX in the remote device, transmitting the SL data from the remote device based on active time derived in each of the one or more SL DRX configurations.

In some embodiments of the present application, the plurality of SL DRX configurations are configured based on layer 2 (L2) destination ID, and determining the one or more SL DRX configurations for the MAC layer includes: determining, in the MAC layer, the one or more SL DRX configurations for the MAC layer to be the plurality of SL DRX configurations.

In some embodiments of the present application, transmitting the SL data further includes: selecting a L2 destination ID during a logical channel prioritization (LCP) procedure, wherein an SL DRX configuration associated with the L2 destination ID of the one or more SL DRX configurations is in the active time. In some embodiments, the first configuration information is predefined per resource pool; the first configuration information is pre-configured per resource pool to the first UE; or the first configuration information is configured per resource pool to the first UE via a higher layer signalling.

In some embodiments of the present application, the plurality of SL DRX configurations are configured based on quality of service (QoS) related parameter.

In an embodiment of the present application, determining the one or more SL DRX configurations for the MAC layer includes: for each logical channel, determining, in a radio resource control (RRC) layer of the remote device, at least one SL DRX configuration from the plurality of SL DRX configurations based on a mapping relationship between QoS related parameter and sidelink radio bearer (SLRB) and a mapping relationship between the SLRB and the logical channel.

In another embodiment of the present application, determining the one or more SL DRX configurations for the MAC layer further includes: for each logical channel, determining, in the RRC layer, one SL DRX configuration from the at least one SL DRX configuration based on a pre-defined rule.

In yet another embodiment of the present application, transmitting the SL data further includes: selecting one or more logical channels during a LCP procedure, wherein an SL DRX configuration associated with each logical channel of the one or more logical channels is in the active time.

In yet another embodiment of the present application, determining the one or more SL DRX configurations for the MAC layer includes: for each L2 destination ID, determining, in a RRC layer of the remote device, at least one SL DRX configuration from the plurality of SL DRX configurations based on a mapping relationship between QoS related parameter and L2 destination ID.

In yet another embodiment of the present application, determining the one or more SL DRX configurations for the MAC layer further includes: for each L2 destination ID, determining, in the RRC layer, one SL DRX configuration from the at least one SL DRX configuration based on a pre-defined rule.

In yet another embodiment of the present application, transmitting the SL data further includes: selecting a L2 destination ID during a LCP procedure, wherein an SL DRX configuration associated with the L2 destination ID of the one or more SL DRX configurations is in the active time.

In yet another embodiment of the present application, determining the one or more SL DRX configurations for the MAC layer includes: indicating, in a RRC layer of the remote device, a mapping relationship between QoS related parameter and SL DRX configuration to the MAC layer of the remote device.

In yet another embodiment of the present application, transmitting the SL data further includes: obtaining one or more packets of the SL data, wherein each of the one or more packets is labelled with a QoS related parameter; and selecting one or more logical channel each contains a packet during a LCP procedure, wherein an SL DRX configuration associated with the packet of the one or more SL DRX configurations is in the active time.

In some embodiments of the present application, the plurality of SL DRX configurations are configured based on SLRB, radio link control (RLC) bearer, or logical channel (LCH).

In an embodiment of the present application, determining the one or more SL DRX configurations for the MAC layer includes: determining, in the MAC layer, the one or more SL DRX configurations for the MAC layer to be the plurality of SL DRX configurations.

In another embodiment of the present application, transmitting the SL data further includes: selecting one or more logical channel during a LCP procedure, wherein an SL DRX configuration associated with each logical channel of the one or more logical channels is in the active time.

In yet another embodiment of the present application, determining the one or more SL DRX configurations for the MAC layer further includes: for each L2 destination ID, determining one SL DRX configuration from at least one SL DRX configuration associated with a corresponding L2 destination ID of the plurality of SL DRX configurations based on a pre-defined rule.

In yet another embodiment of the present application, transmitting the SL data further includes: selecting a L2 destination ID during a LCP procedure, wherein an SL DRX configuration associated with the L2 destination ID of the one or more SL DRX configurations is in the active time.

According to some embodiments of the present application, a method for a wireless communication may include: obtaining, by a remote device, a plurality of SL DRX configurations for SL communication; determining, by the remote device, one or more SL DRX configurations from the plurality of SL DRX configurations for a MAC layer of the remote device; and receiving SL data based on active time derived in each of the one or more SL DRX configurations.

In some embodiments of the present application, the plurality of SL DRX configurations are configured based on L2 destination ID, and determining the one or more SL DRX configurations for the MAC layer includes: determining, in the MAC layer, the one or more SL DRX configurations for the MAC layer to be the plurality of SL DRX configurations.

In some embodiments of the present application, receiving the SL data further includes: monitoring sidelink control information (SCI) in the case that an SL DRX configuration associated with a L2 destination ID of the one or more SL DRX configurations is in the active time.

In some embodiments of the present application, the plurality of SL DRX configurations are configured based on QoS related parameter.

In an embodiment of the present application, determining the one or more SL DRX configurations for the MAC layer includes: for each logical channel, determining, in a RRC layer of the remote device, at least one SL DRX configuration from the plurality of SL DRX configurations based on a mapping relationship between QoS related parameter and SLRB and a mapping relationship between the SLRB and the logical channel.

In another embodiment of the present application, determining the one or more SL DRX configurations for the MAC layer further includes: for each logical channel, determining, in the RRC layer, one SL DRX configuration from the at least one SL DRX configuration based on a pre-defined rule.

In yet another embodiment of the present application, receiving the SL data further includes: monitoring SCI in the case that an SL DRX configuration associated with a logical channel of the one or more SL DRX configurations is in the active time.

In yet another embodiment of the present application, determining the one or more SL DRX configurations for the MAC layer includes: for each L2 destination ID, determining, in a RRC layer of the remote device, at least one SL DRX configuration from the plurality of SL DRX configurations based on a mapping relationship between QoS related parameter and L2 destination ID.

In yet another embodiment of the present application, determining the one or more SL DRX configurations for the MAC layer further includes: for each L2 destination ID, determining, in the RRC layer, one SL DRX configuration from the at least one SL DRX configuration based on a pre-defined rule.

In yet another embodiment of the present application, receiving the SL data further includes: monitoring SCI for a L2 destination ID in the case that an SL DRX configuration associated with the L2 destination ID of the one or more SL DRX configurations is in the active time.

In yet another embodiment of the present application, determining the one or more SL DRX configurations for the MAC layer includes: indicating, in a RRC layer of the remote device, a mapping relationship between QoS related parameter and SL DRX configuration to the MAC layer of the remote device.

In yet another embodiment of the present application, receiving the SL data further includes: monitoring sidelink control information (SCI) in the case that an SL DRX configuration associated with a QoS related parameter of the one or more SL DRX configurations is in the active time.

In some embodiments of the present application, the plurality of SL DRX configurations are configured based on SLRB, radio link control (RLC) bearer, or LCH.

In an embodiment of the present application, determining the one or more SL DRX configurations for the MAC layer includes: determining, in the MAC layer, the one or more SL DRX configurations for the MAC layer to be the plurality of SL DRX configurations.

In another embodiment of the present application, receiving the SL data further includes: monitoring sidelink control information (SCI) in the case that an SL DRX configuration associated with a SLRB, a RLC bearer, or a LCH of the one or more SL DRX configurations is in the active time.

In yet another embodiment of the present application, determining the one or more SL DRX configurations for the MAC layer further includes: for each L2 destination ID, determining one SL DRX configuration from at least one SL DRX configuration associated with a corresponding L2 destination ID of the plurality of SL DRX configurations based on a pre-defined rule.

In yet another embodiment of the present application, receiving the SL data further includes: monitoring sidelink control information (SCI) in the case that an SL DRX configuration associated with a L2 destination ID of the one or more SL DRX configurations is in the active time.

Some embodiments of the present application also provide an apparatus including: at least one non-transitory computer-readable medium having computer executable instructions stored therein, at least one receiving circuitry; at least one transmitting circuitry; and at least one processor coupled to the at least one non-transitory computer-readable medium, the at least one receiving circuitry and the at least one transmitting circuitry. The computer executable instructions are programmed to implement any method as stated above with the at least one receiving circuitry, the at least one transmitting circuitry and the at least one processor.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of the currently preferred embodiments of the present application and is not intended to represent the only form in which the present application may be practiced. It is to be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3rd generation partnership project (3GPP) 5G (i.e., NR), 3GPP long term evolution (LTE) Release 8 and so on. Persons skilled in the art know very well that, with the development of network architecture and new service scenarios, the embodiments in the present application are also applicable to similar technical problems; and moreover, the terminologies recited in the present application may change, which should not affect the principle of the present application.

Figure 1:
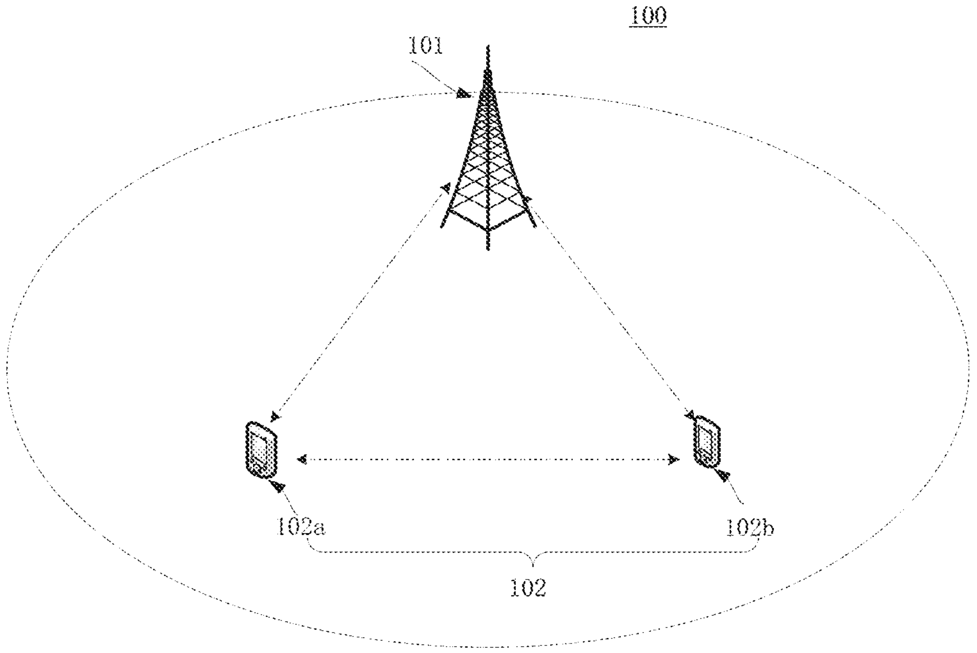
FIG. 1 is a schematic diagram illustrating an exemplary wireless communication system according to some embodiments of the present application.

FIG. 1 is a schematic diagram illustrating an exemplary wireless communication system 100 according to some embodiments of the present application.

As shown in FIG. 1, the wireless communication system 100 includes at least one base station (BS) 101 and at least one UE 102. In particular, the wireless communication system 100 includes one BS 101 and two UEs 102 (e.g., a UE 102*a* and a UE 102*b*) for illustrative purpose. Although a specific number of BS 101 and UEs 102 are depicted in FIG. 1, it is contemplated that any number of BSs 101 and UEs 102 may be included in the wireless communication system 100.

The wireless communication system 100 is compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

The BS 101 may also be referred to as an access point, an access terminal, a base, a macro cell, a node-B, an enhanced node B (eNB), a gNB, a home node-B, a relay node, or a device, or described using other terminology used in the art. The BS 101 is generally part of a radio access network that may include a controller communicably coupled to the BS 101.

According to some embodiments of the present application, the UE(s) 102 may include vehicle UEs (VUEs) and/or power-saving UEs (also referred to as power sensitive UEs). The power-saving UEs may include vulnerable road user (VRUs), public safety UEs (PS-UEs), and/or commercial sidelink UEs (CS-UEs) that are sensitive to power consumption. In an embodiment of the present application, a VRU may include a pedestrian UE (P-UE), a cyclist UE, a wheelchair UE or other UEs which require power saving compared with a VUE. In an embodiment of the present application, the UE 102*a* may be a power-saying UE and the UE 102*b* may be a VUE.

According to some other embodiments of the present application, the UE(s) 102 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like.

According to some other embodiments of the present application, the UE(s) 102 may include a portable wireless communication device, a smart phone, a cellular telephone, a flip phone, a device having a subscriber identity module, a personal computer, a selective call receiver, or any other device that is capable of sending and receiving communication signals on a wireless network.

According to some other embodiments of the present application, the UE(s) 102 may include wearable devices, such as smart watches, fitness bands, optical head-mounted displays, or the like.

Moreover, the UE(s) 102 may be referred to as a subscriber unit, a mobile, a mobile station, a user, a terminal, a mobile terminal, a wireless terminal, a fixed terminal, a subscriber station, a user terminal, or a device, or described using other terminology used in the art.

Both the UE 102*a* and the UE 102*b* in the embodiments of FIG. 1 may transmit information to the BS 101 and receive control information from the BS 101, for example, via LTE or new radio (NR) Uu interface.

According to some embodiments of FIG. 1, the UE 102*a* may function as a transmitting (Tx) UE, and the UE 102*b* may function as a receiving (Rx) UE. The UE 102*a* may transmit messages to the UE 102*b* through a sidelink, for example, PC5 interface as defined in 3GPP TS 23.303. The UE 102*a* may transmit information or data to other UE(s) within the wireless communication system 100, through sidelink unicast, sidelink groupcast, or sidelink broadcast. For instance, the UE 102*a* may transmit data to the UE 102*b* in a sidelink unicast session. The UE 102*a* may transmit data to the UE 102*b* and other UE(s) in a groupcast group (not shown in FIG. 1) by a sidelink groupcast transmission session. Also, the UE 102*a* may transmit data to the UE 102*b* and other UE(s) (not shown in FIG. 1) by a sidelink broadcast transmission session.

According to some other embodiments of FIG. 1, the UE 102*b* may function as a transmission (Tx) UE and transmit messages, and the UE 102*a* may function as a reception (Rx) UE and receive the messages from the UE 102*b*.

In RAN2 #113e, the SL DRX configuration granularity for sidelink communication, e.g., broadcast or groupcast communication was discussed. It was agreed that the SL DRX configuration requires more granularity than the cast type, e.g., broadcast or groupcast. Then, how to determine the SL DRX configuration for sidelink communication for difference granularity needs to be solved.

Given this, embodiments of the present application provides a technical solution for SL communication, which determines three kinds of granularity for SL DRX configuration, including: SL DRX configurations configured per L2 destination ID, SL DRX configurations configured per QoS related parameter, and SL DRX configurations configured per SLRB, or RLC bearer, or LCH.

In addition, a SL DRX procedure is handled by a MAC layer of the UE. However, the SL DRX configurations under some kinds of granularity cannot be directly used by the MAC layer. For example, for the SL DRX configurations configured per QoS related parameter, since the QoS related parameter is not configured to the MAC layer, the MAC layer cannot maintain the SL DRX configurations configured per QoS related parameter, and thus cannot determine the active time of each SL DRX configuration. From the Tx UE's point of view, the MAC layer cannot transmit data based on the active time of the SL DRX configurations. Given this, embodiments of the present application also propose a solution regarding how to determine SL DRX configurations used by the MAC layer for the three kinds of granularity.

Moreover, embodiments of the present application also propose a solution regarding how to select destination ID (or "destination") or LCH under the three kinds of granularity.

More details on embodiments of the present application will be illustrated in the following text in combination with the appended drawings.

According to some embodiments of the present application, a MAC layer of a UE (e.g., a Tx UL or Rx UE) may have one or more L2 destination IDs, each L2 destination ID may be associated with a service. In some embodiments of the present application, the service may have one or more QoS related parameters. The QoS related parameter may refer to one of: QoS flow, QoS profile, or any QoS parameter in the QoS profile. In some other embodiments of the present application, the service may have one or more QoS flows. Each QoS flow is associated with a QoS profile and with a QoS flow indicator (QFI). Each QoS profile has a set of QoS parameters, e.g., PQI, priority, packet delay budget (PDB), packet error rate (PER), etc. Accordingly, each L2 destination ID may be associated with one or more QoS parameters, one or more QoS flows, or one or more QoS profiles. The mapping relationship between the one or more QoS parameters (or one or more QoS flows or one or more QoS profiles) and the L2 destination ID may be received from a higher layer (i.e., a layer higher than AS layer) of the UE. In an embodiment of the present application, the higher layer may be a vehicle to everything (V2X) layer.

In addition, each L2 destination ID may also be associated with one or more SLRB configurations. Each SLRB configuration may include a mapping relationship between QoS flows (wherein each QoS flow is associated with one set of QoS parameters) and a corresponding SLRB and a radio link control (RLC) bearer configuration including a logical channel configuration. In other words, each SLRB may be associated with one or more QoS flows and associated with a corresponding RLC bearer. Each RLC bearer may be associated with a corresponding LCH. Consequently, each SLRB may be associated with a corresponding LCH.

Figure 2:
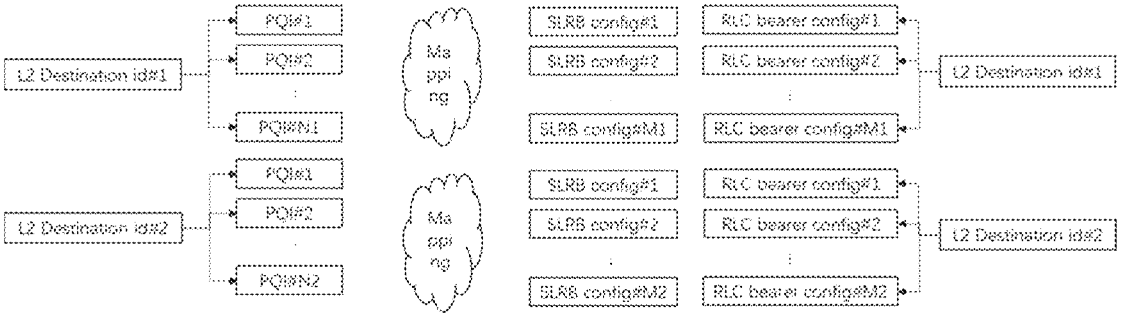
FIG. 2 illustrates an exemplary mapping relationship between L2 destination ID, PC5 QoS indicator (PQI), and SLRB according to some embodiments of the present application.

FIG. 2 illustrates an exemplary mapping relationship between L2 destination ID, PQI, and SLRB according to some embodiments of the present application.

Referring to FIG. 2, it is assumed that the MAC layer of a UE has two L2 destination IDs, e.g., L2 Destination id #1 and L2 Destination id #2.

Each L2 destination ID may be associated with one or more QoS related parameters, e.g., PQI #1, PQI #2 etc. as shown in FIG. 2. The mapping relationship between the one or more PQIs and the L2 destination ID may be received from the V2X layer of the UE. For example, the V2X layer may indicate to the MAC layer that L2 Destination id #1 is associated with PQI #1 to PQI #N1 and L2 Destination id #2 is associated with PQI #1 to PQI #N2, wherein N1 and N2 are integers larger than 0, N1 may be the same or different from N2.

Persons skilled in the art can understand that "#1," "#2," . . . "#N1" are the indexes of PQIs for L2 Destination id #1, but are not the value of the PQIs. Similarly, "#1," "#2," . . . "#N2" are the indexes of PQIs for L2 destination ID #1, but are not the value of the PQIs. In addition, for different L2 destination IDs, the same PQI index may refer to the same or different PQIs. For example, for L2 Destination id #1 and L2 Destination id #2, "PQI #1" may refer to the same PQI or two different PQIs. The same principle may be also suitable for the following indexes of SLRB configurations and RLC bearer configurations.

Each L2 destination ID may be associated with one or more SLRB configurations. For example, L2 Destination id #1 is associated with SLRB config #1 to SLRB config #M1 and L2 Destination id #2 is associated with SLRB config #1 to SLRB config #M2, wherein M1 and M2 are integers larger than 0, M1 may be the same or different from M2.

Each SLRB configuration may include a relationship between one or more PQIs and a corresponding SLRB and a corresponding RLC bearer configuration. For example, for L2 Destination ID #1, the SLRB config #1 may include a RLC bearer config #1, the SLRB config #2 may include a RLC bearer config #2, . . . and the SLRB config #M1 may include a RLC bearer config #M1. For L2 Destination ID #2, the SLRB config #1 may include a RLC bearer config #1, the SLRB config #2 may include a RLC bearer config #2, . . . and the SLRB config #M1 may include a RLC bearer config #M2. In other words, each SLRB is associated with a corresponding RLC bearer.

Each RLC bearer configuration may include a LCH configuration (not shown in FIG. 2). For example, the RLC bearer config #2 may include a LCH config #2 (not shown in FIG. 2). That is, each RLC bearer is associated with a corresponding logical channel. Consequently, each SLRB may be associated with a corresponding LCH.

Although a specific number of L2 destination IDs are depicted in FIG. 2, it is contemplated that any number of L2 destination IDs may be included in the MAC layer in some other embodiments of the present application. In addition, although PQI is depicted in FIG. 2 to illustrate the mapping relationship, it is contemplated that the PQI may be replaced with any other QoS parameter in a QoS profile, or may be replaced with a QoS flow, or may be replaced with a QoS profile in some other embodiments of the present application.

Figure 3:
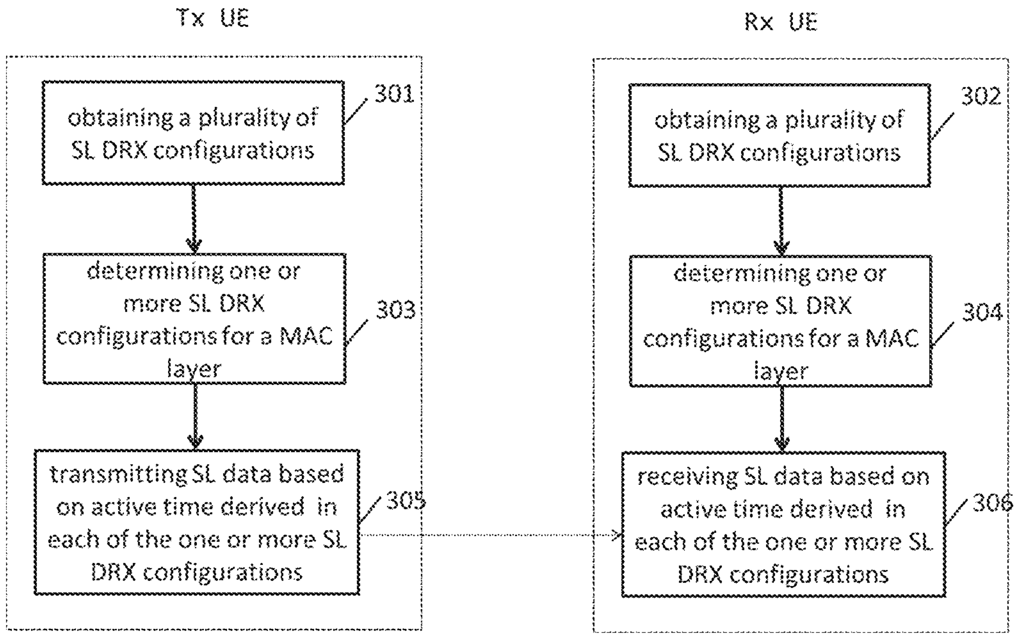
FIG. 3 is a flow chart illustrating an exemplary method for SL DRX configuration according to some embodiments of the present application.

FIG. 3 is a flow chart illustrating a method for SL DRX configurations according to some embodiments of the present application. Although the method is illustrated in a system level by two remote devices, e.g., a Tx UE and a Rx UE, Persons skilled in the art can understand that the method implemented in the Tx UE and that implemented in the Rx UE can be separately implemented and incorporated by other apparatus with the like functions. In some embodiments of the present application, the Tx UE or the Rx UE, performs sidelink communication in broadcast or groupcast manner. For example, the Tx UE may be UE 102*a* as shown in FIG. 1 and the Rx UE may be UE 102*b* as shown in FIG. 1.

In the exemplary method shown in FIG. 3, in step 301, the Tx UE may obtain a plurality of SL DRX configurations for SL communication.

According to some embodiments of the present application, the plurality of SL DRX configurations may be pre-configured in the Tx UE, for example, in a subscriber identity module (SIM), in a universal subscriber identity module (USIM), or in a memory of the Tx UE. Therefore, obtaining the plurality of SL DRX configurations may refer to access the SIM, USIM or the memory for acquiring the plurality of SL DRX configurations inside the Tx UE.

According to some other embodiments of the present application, a BS 101 as shown in FIG. 1 may transmit the plurality of SL DRX configurations to the UE(s) 102 (e.g., the Tx UE 102*a* and the Rx UE 102*b*). Then, the Tx UE may obtain the plurality of SL DRX configurations from the BS. In an embodiment of the present application, the BS 101 may broadcast the plurality of SL DRX configurations in at least one SIB. Then, the Tx UE may receive the plurality of SL DRX configurations in the at least one SIB broadcasted by the BS 101. In another embodiment of the present application, the BS 101 may configure the plurality of SL DRX configurations via at least one RRC signaling. Then, the Tx UE may receive the plurality of SL DRX configurations via the at least one RRC signaling.

The same operation may also be performed by the Rx UE. That is, in step 302, the Rx UE may also obtain the plurality of SL DRX configurations for SL communication. Similarly, the Rx UE may obtain the plurality of SL DRX configurations by pre-configuration e.g., the plurality of SL DRX configurations are pre-configured in the Rx UE). Otherwise, the Rx UE may obtain the plurality of SL DRX configurations in at least one SIB broadcasted by the BS 101, or may obtain the plurality of SL DRX configurations via at least one RRC signaling transmitted from the BS 101.

According to some embodiments of the present application, each of the plurality SL DRX configurations may include at least one of the following parameters: on-duration time of a DRX; off-duration time of a DRX; wake-up time of a DRX; a set of SL DRX timers associated with a DRX; a DRX cycle; and a DRX offset value.

In an embodiment of the present application, the set of SL DRX timers associated with a DRX may include at least one of: an on-duration timer, an inactivity timer, a hybrid automatic repeat request (HARQ) round trip time (RTT) timer, a HARQ retransmission timer, and any other timers associated with the DRX as specified in 3GPP standard documents.

The plurality of SL DRX configurations may be configured based on one of the following three kinds of granularity.

The plurality of SL DRX configurations are configured based on L2 destination ID. This kind of granularity may also be referred to "SL DRX configurations configured per L2 destination ID", which is also expressed as "the SL DRX configuration is configured per L2 destination ID", or "each of the plurality of SL DRX configurations is configured per L2 destination ID" etc. In this kind of granularity, each L2 destination ID may be associated with a DRX configuration of the plurality of SL DRX configurations. In other words, one DRX configuration of the plurality of SL DRX configurations may be associated with one or more L2 destination IDs.

In an embodiment, more than one L2 destination ID or a group of L2 destination IDs can be configured with one SL DRX configuration, and all of the other L2 destination IDs that are not explicitly configured with SL DRX configuration may be configured with a default SL DRX configuration.

The plurality of SL DRX configurations are configured based on QoS related parameter. The QoS related parameter may refer to one of: QoS flow, QoS profile, or any QoS parameter in the QoS profile. This kind of granularity may also be referred to "SL DRX configurations configured per QoS related parameter", which is also expressed as "the SL DRX configuration is configured per QoS related parameter", or "each of the plurality of SL DRX configurations is configured per QoS related parameter" etc. In this kind of granularity, each QoS related parameter (e.g., QoS flow, QoS profile, or any QoS parameter in the QoS profile) may be associated with a DRX configuration of the plurality of SL DRX configurations. In other words, one DRX configuration of the plurality of SL DRX configurations may be associated with one or more QoS related parameters.

In an embodiment, more than one QoS related parameters or a group of QoS related parameters can be configured with one SL DRX configuration, and all of the other QoS related parameters that are not explicitly configured with SL DRX configuration may be configured with a default SL DRX configuration.

The plurality of SL DRX configurations are configured based on SLRB, RLC bearer, or LCH. This kind of granularity may also be referred to "SL DRX configurations configured per SLRB, RLC bearer, or LCH", which is also expressed as "the SL DRX configuration is configured per SLRB, RLC bearer, or LCH," or "each of the plurality of SL DRX configurations is configured per SLRB, RLC bearer, or LCH," etc. In this kind of granularity, each SLRB, or RLC bearer, or LCH may be associated with a DRX configuration of the plurality of SL DRX configurations. In other words, one DRX configuration of the plurality of SL DRX configurations may be associated with one or more SLRBs, or one or more RLC bearers, or one or more LCHs.

In an embodiment, more than one SLRB or RLC bearer or LCH, or a group of SLRB or RLC bearers or LCHs can be configured with one SL DRX configuration, and all of the other SLRBs, or RLC bearers, or LCHs that are not explicitly configured with SL DRX configuration may be configured with a default SL DRX configuration.

After obtaining the plurality of SL DRX configurations, in step 303, the Tx UE may determine one or more SL DRX configurations from the plurality of SL DRX configurations for a MAC layer of the Tx UE. Similarly, after obtaining the plurality of SL DRX configurations, in step 304, the Rx UE may determine one or more SL DRX configurations from the plurality of SL DRX configurations for a MAC layer of the Rx UE. The Tx UE and the Rx UE may use the same method to determine one or more SL DRX configurations for their MAC layers, respectively.

Then, in step 305, in the case that there is SL data associated with DRX in the Tx UE, the Tx UE may transmit the SL data from the Tx UE based on the active time derived in each of the one or more SL DRX configurations. The Tx UE may transmit the SL data to one or more other UEs including the Rx UE via a broadcast manner or a groupcast manner. In step 306, the Rx UE may receive the SL data based on the active time derived in each of the one or more SL DRX configurations.

Embodiments I

According to some embodiments of the present application, the plurality of SL DRX configurations may be configured based on L2 destination ID. That is, each L2 destination ID may be associated with a SL DRX configuration of the plurality of SL DRX configurations. In such embodiments, all of the plurality of SL DRX configurations may be used for the MAC layer of a UE (e.g., a Tx UE or an Rx UE).

Consequently, for the Tx UE, determining the one or more SL DRX configurations for the MAC layer in step 303 may include: the MAC layer of the Tx UE determines the one or more SL DRX configurations for the MAC layer to be the plurality of SL DRX configurations. Each L2 destination ID may be associated with a SL DRX configuration of the plurality of SL DRX configurations. Then, for each L2 destinations ID, the MAC layer of the Tx UE may maintain a set of SL DRX timers of a SL DRX configuration configured for the L2 destination ID.

In some embodiments of the present application, the set of SL DRX timers may include at least one of: on-duration timer, inactivity timer, HARQ RTT timers, HARQ retransmission timers, and any other timers as specified in 3GPP standard documents.

For example, it is assumed that the plurality of SL DRX configurations include two ST DRX configurations (e.g., SL DRX configuration #1 and SL DRX configuration #2), wherein the SL DRX configuration #1 is configured for L2 Destination id #1 and the SL DRX configuration #2 is configured for L2 Destination id #2. After obtaining the two SL DRX configurations, the MAC layer of a UE (e.g., a Tx UE or Rx UE) may determine the two SL DRX configurations for the MAC layer. For L2 Destination id #1, the MAC layer of the UE may maintain a first set of SL DRX timers (including al least one of: on-duration timer, inactivity timer, HARQ RTT timers. HARQ retransmission timers, etc.). For L2 Destination the MAC layer of the UE may maintain second set of SL DRX timers (including at least one of: on-duration timer, inactivity timer, HARQ RTT timers, HARQ retransmission timers, etc.)

After determining the one or more SL DRX configurations, in step 305, transmitting the SL data may further include: the MAC layer of the Tx UE selects a L2 destination ID during a LCP procedure, wherein an SL DRX configuration associated with the L2 destination ID of the one or more SL DRX configurations is in the active time. As an example, the SL DRX configuration being in active time may refer to at least one timer (if any) of the SL DRX configuration for the L2 destination ID is running, e.g. at least one of on-duration timer, inactivity timer, and HARQ retransmission timer is running. As another example, the SL DRX configuration being in active time may refer to the SL DRX configuration being in one or more time ranges or time periods which are defined as the SL DRX active time in 3GPP standard documents.

The procedure for selecting an L2 destination ID may be performed as follows: firstly, the Tx UE may select a LCH with the highest priority among the LCHs that fulfills the conditions as specified in 3GPP standard documents in LCP. Since one or more LCHs may be associated with a L2 destination ID, the Tx UE may determine a L2 destination ID associated with the selected LCH based on a mapping relationship between the destination ID and the one or more LCHs.

After determining the L2 destination ID, the Tx UE may determine whether the SL DRX configuration associated with the L2 destination ID is in active time. The SL DRX configuration being in active time may refer to the SL DRX configuration being one or more time ranges or time periods which are defined as the SL DRX active time, or at least one SL DRX timer of a set of SL DRX timers (including on-duration timer, inactivity timer, and HARQ retransmission timer) of the SL DRX configuration is running, e.g. the on-duration timer is running. In other words, the Tx UE may check an active time condition or whether at least one SL DRX timer of the set of SL DRX timers associated with the L2 destination ID is running. In the case that the active time condition is fulfilled or at least one SL DRX timer of the set of SL DRX timers associated with the L2 destination ID is running, the SL DRX configuration associated with the L2 destination ID is in active time, thus the L2 destination ID can be selected by the Tx UE for transmission, and then all the LCHs associated with the L2 destination ID may be selected for transmission.

In the case that the active time condition is not fulfilled, or none of the set of SL DRX timers associated with the L2 destination ID is running, the SL DRX configuration associated with the L2 destination ID is not in the active time, and thus the L2 destination ID cannot be selected. The Tx UE may select another LCH with the highest priority from the remaining LCHs, and perform the above procedure until a L2 destination ID is selected.

The Rx UE may perform the same operation in step 304 as that performed by the Tx UE in step 303. That is, the MAC layer of the Rx UE may determine the one or more SL DRX configurations for the MAC layer to be the plurality of SL DRX configurations. For each L2 destinations ID, the MAC layer of the Rx UE may maintain a set of SL DRX timers of a SL DRX configuration configured for the L2 destination ID.

In step 306, the Rx UE may receive SL data based on the active time derived in each of the one or more SL DRX configurations. In some embodiments of the present application, receiving the SL data may further include: monitoring SCI in the case that an SL DRX configuration associated with a L2 destination ID of the one or more SL DRX configurations is in the active time. The SL DRX configuration being in active time may refer to that at least one SL DRX timer of a set of SL DRX timers of the SL DRX configuration is running (e.g. at least one of on-duration timer, inactivity timer, and HARQ retransmission timer is running) or the SL DRX configuration being in one or more time ranges or time periods defined as SL DRX active time. In other words, the Rx UE will monitor SCI for a L2 destination ID if at least one SL DRX timer of the set of SL DRX timers of the SL DRX configuration associated with the L2 destination ID is running. In an embodiment of the present application, the Rx UE will wake up to monitor SCI during the active time of all of the one or more SL DRX configurations.

Embodiments II

According to some embodiments of the present application, the plurality of SL DRX configurations may be configured based on QoS related parameter. As states above, each QoS flow is associated with a QoS profile. Each QoS profile has a set of QoS parameters, including PQI, PDB, PER, etc. Accordingly, the QoS related parameter herein may refer to QoS flow, QoS profile, or any QoS parameter (e.g., PQI) in the QoS profile. That is, in Embodiments II, each QoS related parameter may be associated with a SL DRX configuration, which may refer to one of: each QoS flow is associated with a SL DRX configuration, each QoS profile is associated with a SL DRX configuration, or each QoS parameter (e.g., PQI) in the QoS profile is associated with a SL DRX configuration. In such embodiments, the plurality of SL DRX configurations cannot be directly used for the MAC layer of a UE (e.g., a Tx UE or an Rx UE).

Embodiments II-1

In embodiments II-1, after receiving the plurality of SL DRX configurations configured based on QoS related parameter, in step 303, the RRC layer of the Tx UE may determine the one or more SL DRX configurations for the MAC layer, which includes: for each logical channel of the Tx UE, the RRC layer of the Tx UE may determine (or derive) at least one SL DRX configuration from the plurality of SL DRX configurations based on a mapping relationship between QoS related parameter and SLRB and a mapping relationship between the SLRB and the logical channel.

As stated in FIG. 2, at least one QoS related parameter may be mapped to one SLRB, this mapping relationship may be included in the SLRB configuration. In addition, each SLRB configuration may also include a RLC bearer configuration, and the RLC bearer configuration may include a LCH configuration. Consequently, each SLRB may correspond to or associated with a LCH. That is, based on the SLRB configuration, the RRC layer determines that each LCH may be associated with at least one QoS related parameter, and the at least one SL DRX configuration configured for the at least one QoS related parameter may be used for the corresponding LCH. In some embodiments of the present application, the SLRB configuration may be obtained by pre-configuration in the Tx UE or in at least one SIB transmitted by the BS.

After determining the at least one SL DRX configuration for each LCH, the RRC layer may indicate the at least one SL DRX configuration for each LCH to the MAC layer. Then, for each LCH, the MAC layer of the Tx UE may maintain at least one set of SL DRX timers. In some embodiments of the present application, a set of SL DRX timers may include at least one of on-duration timer, inactivity timer, HARQ RTT timers, HARQ retransmission timers, and any other timers as specified in 3GPP standard documents.

For example, it is assumed that the plurality of SL DRX configurations include three SL DRX configurations (e.g., SL DRX configuration #1, SL DRX configuration #2, and SL DRX configuration #3), wherein the SL DRX configuration #1 is configured for QoS related parameter #1, the SL DRX configuration #2 is configured for QoS parameter #2, and the SL DRX configurator #3 is configured for QoS parameter #3. Moreover, it is assumed that QoS related parameter #1 and QoS related parameter #2 are mapped to a SLRB #1 and the SLRB #1 is mapped to LCH #1 based on a SLRB configuration for SLRB #1, and that QoS related parameter #3 is mapped to a SLRB #2 and the SLRB #1 is mapped to LCH #2 based on a SLRB configuration for SLRB #2. Then, after obtaining the three SL DRX configurations, the RRC layer of the Tx UE may determine that SL DRX. configuration #1 and SL DRX configuration #2 for LC #1 and SL DRX configuration #3 for LCH #2, and indicate the same to the MAC layer of the Tx UE. After receiving the above information, for LCH #1, the MAC layer of the UE may maintain a first set of SL DRX timers of SL DRX configuration #1 and a second set of SL DRX timers of SL DRX configuration #2, for LCH #2, the MAC layer may maintain a third set of SL DRX timers of SL DRX configuration #3. Each set of SL DRX timers may include at least one of: on-duration timer, inactivity timer, HARQ RTT timers, HARQ retransmission timers, etc.

After determining the one or more SL DRX configurations, in step 305, transmitting the SL data may further include: the MAC layer of the Tx UE selects one or more LCHs during a LCP procedure, wherein an SL DRX configuration associated with each logical channel of the one or more logical channels is in the active time. The procedure for selecting one or more LCHs may be performed as follows: firstly, the Tx UE may select a LCH with the highest priority from all LCHs whose SL DRX configurations are in the active time, and then the Tx UE may determine a L2 destination ID associated with the LCH based on a mapping relationship between the destination ID and one or more LCHs. After determining the L2 destination ID, the Tx UE may select one or more LCHs associated with the L2 destination ID whose SL DRX configurations are in the active time. The SL DRX configuration being in active time may refer to that at least one SL DRX timer of a set of SL DRX timers of the SL DRX configuration is running (e.g. at least one of on-duration timer, inactivity timer, and HARQ retransmission timer is running) or the SL DRX configuration being in one or more time ranges or time periods defined as SL DRX active time.

The Rx UE may perform the same operation in step 304 as that performed by the Tx UE in step 303. That is, after receiving the plurality of SL DRX configurations configured based on QoS related parameter, in step 304, the RRC layer of the Rx UE may determine the one or more SL DRX configurations for the MAC layer, which includes: for each logical channel of the Rx UE, the RRC layer of the Rx UE may determine (derive) at least one SL DRX configuration from the plurality of SL DRX configurations based on a mapping relationship between QoS related parameter and SLRB and a mapping relationship between the SLRB and the logical channel.

After determining the at least one SL DRX configuration for each LCH, the RRC layer of the Rx UE may indicate the at least one SL DRX configuration for each LCH to the MAC layer of the Rx UE. Then, for each LCH, the MAC layer of the Rx UE may maintain at least one set of SL DRX timers. In some embodiments of the present application, the set of SL DRX timers may include at least one of on-duration timer, inactivity timer, HARQ RTT timers, HARQ retransmission timers, and any other timers as specified in 3GPP standard documents.

In step 306, the Rx UE may receive SL data based on the active time derived in each of the one or more SL DRX configurations. In some embodiments of the present application, receiving, the SL data may further include: monitoring SCI in the case that an SL DRX configuration associated with a LCH of the one or more SL DRX configurations is in the active time. The SL DRX configuration being in active time may refer to that at least one SL DRX timer of a sot of SL DRX timers of the SL DRX configuration is running (e.g. at least one of on-duration timer, inactivity timer, and HARQ retransmission timer is running) or the SL DRX configuration being in one or more time ranges or time periods defined as SL DRX active time. In other words, the Rx UE will monitor SCI if at least one SL DRX timer of the set of SL DRX timers of the SL DRX configuration associated with the Lai is running. In an embodiment of the present application, the Rx UE will wake up to monitor SCI during the active time of all of the one or more SL DRX configurations.

Embodiments II-2

In Embodiments II-1, the RRC layer of the Tx UE may determine at least one SL DRX for each LCH. In Embodiments II-2, after determining the at least one SL DRX for each LCH based on the methods in Embodiments II-1, in step 303, the RRC layer of the Tx UE may further determine one SL DRX configuration from the at least one SL DRX configuration based on a pre-defined rule for each LCH. The pre-defined rule may define how to combine the at least one SL DRX configuration for each LCH or how to select one SL DRX configuration from the at least one SL DRX configuration for each logical channel.

In an embodiment of the present application, the SL DRX configuration with the minimum periodicity of the at least one SL DRX configuration may be derived as the final SL DRX configuration for a LCH. In another embodiment of the present application, a SL DRX cycle of a SL DRX configuration using the minimum periodicity of the at least one SL DRX configuration may be derived as the final SL DRX configuration for a LCH. In yet another embodiment of the present application. a SL DRX timer of a SL DRX configuration using the maximum value of the at least one SL DRX configuration may be derived as the final SL DRX configuration for a LCH. It is contemplated that any other pre-defined rule may also be used for determining the final SL DRX configuration for an LCH.

After determining the one SL DRX configuration for each LCH, the RRC layer may indicate the one SL DRX configuration for each LCH to the MAC layer. Then, for each LCH, the MAC layer of the Tx UE may maintain one set of SL DRX timers. In some embodiments of the present application, the set of SL DRX timers may include at least one of: on-duration timer, inactivity timer, HARQ RTT timers, HARQ retransmission timers, and any other timers as specified in 3GPP standard documents.

For example, it is assumed that the RRC layer of the Tx UE may determine that SL DRX configuration #1 and SL DRX configuration #2 for LCH #1 and SL DRX configuration #3 for LCH #2 based on the method in Embodiments II-1, then, for LCH #1, the RRC layer of the Tx UE may further determine SL DRX configuration #1 for LCH #1 based on a pre-defined rule. The RRC layer of the Tx UE may indicate the SL DRX configuration #1 for LCH #1 and the SL DRX configuration #3 for LCH #2 to the MAC layer of the Tx UE. After receiving the above information, for LCH #1, the MAC layer of the Tx UE may maintain the first set of SL DRX timers of SL DRX configuration #1, for LCH #2, the MAC layer may maintain third set of SL DRX timers of SL DRX configuration #3. Each set of SL DRX timers may include at least one of: on-duration timer, inactivity timer, HARQ RTT timers, HARQ retransmission timers, etc.

After determining the one or more SL DRX configurations, in step 305, transmitting the SL data may further include: the MAC layer of the Tx UE selects one or more LCHs during a LCP procedure, wherein an SL DRX configuration associated with each logical channel of the one or more logical channels is in the active time. The procedure for selecting one or more LCHs in Embodiments II-2 may be the same as that performed in Embodiments II-1.

The Rx UE may perform the same operation in step 304 as that performed by the Tx UE in step 303. That is, after determining the at least one SL DRX for each LCH based on the methods in Embodiments II-1, in step 304, the RRC layer of the Rx UE may further determine one SL DRX configuration from the at least one SL DRX configuration based on a pre-defined rule for each LCH. The pre-defined rule used by the Rx UE may be the same as that used by the Tx UE.

After determining the one SL DRX configuration for each LCH, the RRC layer of the Rx UE may indicate the one SL DRX configuration for each LCH to the MAC layer of the Rx UE. Then, for each LCH, the MAC layer of the Rx UE may maintain one set of SL DRX timers, In some embodiments of the present application, the set of SL DRX timers may include at least one of on-duration timer, inactivity timer, HARQ WET timers, HARQ retransmission timers, and any other timers as specified in 3GPP standard documents.

In step 306, the Rx UE may receive SL data based on the active time derived in each of the one or more SL DRX configurations. In some embodiments of the present application, receiving the SL data may further include: monitoring SCI in the case that an SL DRX configuration associated with a LCH of the one or more SL DRX configurations is in the active time. The SL DRX configuration being in active time may refer to that at least one SL DRX timer of a set of SL DRX timers of the SL DRX configuration is running (e.g. at least one of on-duration timer, inactivity timer, and HARQ retransmission timer is running) or the SL DRX configuration being in one or more time ranges or time periods defined as SL DRX active time. In other words, the Rx UE will monitor SCI if at least one SL DRX timer of the set of SL DRX timers of the SL DRX configuration associated with LCH is running. In an embodiment of the present application, the Rx UE will wake up to monitor SCI during active time of all of the one or more SL DRX configurations.

Embodiments II-3

In embodiments II-3, after receiving the plurality of SL DRX configurations configured based on QoS related parameter, in step 303, the RRC layer of the Tx UE may determine the one or more SL DRX configurations for the MAC layer, which includes: for each L2 destination ID of the Tx UE, the RRC layer of the Tx UE may determine (derive) at least one SL DRX configuration from the plurality of SL DRX configurations based on a mapping relationship between PQI and L2 destination ID.

As stated in FIG. 2, at least one QoS related parameter may be mapped to one destination ID. In some embodiments of the present application, the mapping relationship between the QoS related parameter and the destination ID may be obtained by a higher layer signaling, e.g., a signaling from the V2X layer.

After determining the at least one SL DRX configuration for each L2 destination ID, the RRC layer may indicate the at least one SL DRX configuration for each L2 destination ID to the MAC layer. Then, for each L2 destination ID, the MAC layer of the Tx UE may maintain at least one set of SL DRX timers. In some embodiments of the present application, the set of SL DRX timers may include at least one of: on-duration timer, inactivity timer, HARQ RTT timers, HARQ retransmission timers, and any other timers as specified in 3GPP standard documents.

For example, it is assumed that the plurality of SL DRX configurations include three SL DRX configurations (e.g., SL DRX configuration #1, DRX configuration #2, and SL DRX configuration #3), wherein the SL DRX configuration #1 is configured for QoS related parameter #1, the SL DRX configuration #2 is configured for QoS parameter #2, and the SL DRX configuration #3 is configured for QoS parameter #3. Moreover, it is assumed that QoS related parameter #1 and QoS related parameter #2 are mapped to L2 Destination id #1 and QoS related parameter #3 is mapped to L2 Destination id #2. Then, after obtaining the three SL DRX configurations, the RRC layer of the Tx UE may determine that SL DRX configuration #1 and SL DRX configuration #2 for L2 Destination id #1 and SL DRX configuration #3 for L2 Destination id #2, and indicate the same to the MAC layer of the Tx UE. After receiving the above information, for L2 Destination id #1, the MAC layer of the Tx UE may maintain a first set of SL DRX timers of SL DRX configuration #1 and a second set of SL DRX timers of SL DRX configuration #2. For L2 Destination id #2, the MAC layer may maintain a third set of SL DRX timers of SL DRX configuration #3. Each set of SL DRX timers may include at least one of: on-duration timer, inactivity timer, HARQ RTT timers, HARQ retransmission timers, etc.

After determining the one or more SL DRX configurations, in step 305, transmitting the SL data may further include that: the MAC layer of the Tx UE selects L2 destination ID during a LCP procedure, wherein an SL DRX configuration associated with the L2 destination ID of the one or more SL DRX configurations is in the active time. The procedure for selecting the L2 destination ID may be the same as that performed in Embodiments I.

The Rx UE may perform the same operation in step 304 as that performed by the Tx UE in step 303. That is, after receiving the plurality of SL DRX configurations configured based on QoS related parameter, in step 304, the RRC layer of the Rx UE may determine the one or more SL DRX configurations for the MAC layer, which includes: for each L2 destination ID of the Rx UE, the RRC layer of the Rx UE may determine (derive) at least one SL DRX configuration from the plurality of SL DRX configurations based on a mapping relationship between QoS related parameter and L2 destination ID.

After determining the at least one SL DRX configuration for each L2 destination ID, the RRC layer of the Rx UE may indicate the at least one SL DRX configuration for each L2 destination ID to the MAC layer of the Rx UE. Then, for each L2 destination ID, the MAC layer of the Rx UE may maintain at least one set of DRX timers. In some embodiments of the present application, the set of SL DRX timers may include at least one of: on-duration timer, inactivity timer, HARQ RTT timers, HARQ retransmission timers, and any other timers as specified in 3GPP standard documents.

In step 306, the Rx UE may receive SL data based on the active time derived in each of the one or more SL DRX configurations. In some embodiments of the present application, receiving the SL data may further include: monitoring SCI in the case that an SL DRX configuration associated with a L2 destination ID of the one or more SL DRX configurations is in the active time. The SL DRX configuration being in active time may refer to that at least one SL DRX timer of a set of SL DRX timers of the SL DRX configuration is running (e.g. at least one of on-duration timer, inactivity timer, and HARQ retransmission timer is running) or the SL DRX. configuration being in one or more time ranges or time periods defined as SL DRX active time. In other words, the Rx UE will monitor SCI if at least one SL DRX timer of the set of SL DRX timers of the SL DRX configuration associated with the L2 destination ID is running. In an embodiment of the present application, the Rx UE will wake up to monitor SCI during active time of all of the one or more SL DRX configurations.

Embodiments II-4

In Embodiments 11-3, the RRC layer of the Tx UE may determine at least one SL DRX for each L2 destination ID. In Embodiments II-4, after determining the at least one SL DRX for each L2 destination ID based on the methods in Embodiments II-3, in step 303, the RRC layer of the Tx UE may further determine one SL DRX configuration from the at least one SL DRX configuration based on a pre-defined rule for each L2 destination ID. The pre-defined rule may define how to combine the at least one SL DRX configuration for each L2 destination ID or how to select one SL DRX configuration from the at least one SL DRX configuration for each L2 destination ID.

In an embodiment of the present application, the SL DRX configuration with the minimum periodicity of the at least one SL DRX configuration may be derived as the final SL DRX configuration for a L2 destination ID. In another embodiment of the present application, a SL DRX cycle of a SL DRX configuration using the minimum periodicity of the at least one SL DRX configuration may be derived as the final SL DRX configuration for a L2 destination ID. In yet another embodiment of the present application, a SL DRX timer of a SL DRX configuration using the maximum value of the at least one SL DRX configuration may be derived as the final SL DRX configuration for a L2 destination ID. It is contemplated that any other pre-defined rule may also be used for determining the final SL DRX configuration for a L2 destination ID.

After determining the one SL DRX configuration for each L2 destination ID, the RRC layer may indicate the one SL DRX configuration for each L2 destination ID to the MAC layer. Then, for each L2 destination ID, the MAC layer of the Tx UE may maintain one set of SL DRX timers. In some embodiments of the present application, the set of SL DRX timers may include at least one of: on-duration timer, inactivity timer, HARQ RTT timers, HARQ retransmission timers, and any other timers as specified in 3GPP standard documents.

For example, it is assumed that the RRC layer of the Tx UE may determine that SL DRX configuration #1 and SL DRX configuration #2 for L2 destination ID #1 and SL DRX configuration #3 for L2 destination ID #2 based on the method in Embodiments II-3, and then, for L2 destination ID #1, the RRC layer of the Tx UE may further determines SL DRX configuration #1 for L2 destination ID #1 based on a pre-defined rule. The RRC layer of the Tx UE may indicate the SL DRX configuration #1 for L2 destination ID #1 and the SL DRX configuration #3 for L2 destination ID #2 to the MAC layer of the Tx UE. After receiving the above information, for L2 destination ID #1, the MAC layer of the Tx UE may maintain a first set of SL DRX timers of SL DRX configuration #1, for L2 destination ID #2, the MAC layer may maintain a third set of SL DRX timers of SL DRX configuration #3, Each set of SL DRX timers may include at least one of: on-duration timer, inactivity timer, HARQ RTT timers, HARQ retransmission timers, etc.

After determining the one or more SL DRX configurations, in step 305, transmitting the SL data may further include: the MAC layer of the Tx UE selects a L2 destination ID during a LCP procedure, wherein an SL DRX configuration associated with the L2 destination ID of the one or more SL DRX configurations is in the active time. The procedure for selecting a L2 destination ID in Embodiments II-4 may be the same as that performed in Embodiments II-3.

The Rx UE may perform the same operation in step 304 as that performed by the Tx UE in step 303. That is, after determining the at least one SL DRX for each L2 destination ID based on the methods in Embodiments II-3, in step 304, the RRC layer of the Rx UE may further determine one SL DRX configuration from the at least one SL DRX configuration based on a pre-defined rule for each L2 destination ID. The pre-defined rule used by the Rx UE may be same as that used by the Tx UE.

After determining the one SL DRX configuration for each L2 destination ID, the RRC layer of the Rx UE may indicate the one SL DRX configuration for each L2 destination ID to the MAC layer of the Rx UE. Then, for each L2 destination ID, the MAC layer of the Rx UE may maintain one set of SL DRX timers. In some embodiments of the present application, the set of SL DRX timers may include at least one of: on-duration timer, inactivity timer, HARQ RTT timers, HARQ retransmission timers, and any other timers as specified in 3GPP standard documents.

In step 306, the Rx UE may receive SL data based on the active time derived in each of the one or more SL DRX configurations. In some embodiments of the present application, receiving the SL data may further include: monitoring SCI in the case that an SL DRX configuration associated with a L2 destination of the one or more SL DRX configurations is in the active time. The SL DRX configuration being in active time may refer to that at least one SL DRX timer of a set of SL DRX timers of the SL DRX configuration is running (e.g. at least one of on-duration timer, inactivity timer, and HARQ retransmission timer is running) or the SL DRX configuration being in one or more time ranges or time periods defined as SL DRX active time. In other words, the Rx UE will monitor SCI if at least one SL DRX timer of the set of SL DRX timers of the SL DRX configuration associated with a L2 destination ID is running. In an embodiment of the present application, the Rx UE will wake up to monitor SCI during active time of all of the one or more SL DRX configurations.

Embodiments II-5

In embodiments II-5, after receiving the plurality of SL DRX configurations configured based on QoS related parameter, in step 303, the RRC layer of the Tx UE may determine the one or more SL DRX configurations for the MAC layer, which includes: the RRC layer of the Tx UE may indicate a mapping relationship between QoS related parameter and SL DRX configuration to the MAC layer.

After receiving the mapping relationship between QoS related parameter and SL DRX configuration, for each QoS related parameter, the MAC layer of the Tx UE may maintain a set of SL DRX timers. In some embodiments of the present application, the set of SL DRX timers may include at least one of: on-duration timer, inactivity timer, HARQ KIT timers, HARQ retransmission timers, and any other timers as specified in 3GPP standard documents.

For example, it is assumed that the plurality of SL DRX configurations include three SL DRX configurations (e.g., SL DRX configuration #1, SL DRX configuration #2, and SL DRX configuration #3), wherein the SL DRX configuration #1 is configured for QoS related parameter #1, the SL DRX configuration #2 is configured for QoS related parameter #2, and the SL DRX configuration #3 is configured for QoS related parameter #3. Then, after receiving the three SL DRX configurations, the RRC layer may indicate the mapping relationship between the three SL DRX configurations and the three QoS related parameters to the MAC layer of the Tx UE.

After receiving the above information, for QoS related parameter #1, the MAC layer of the UE may maintain first set of SL DRX timers of SL DRX configuration #1; for QoS related parameter #2 the MAC layer of the UE may maintain a second set of SL DRX timers of SL DRX configuration #2; for QoS related parameter #3, the MAC layer may maintain third set of SL DRX timers of SL DRX configuration #3, Each se of SL DRX timers may include at least one of: on-duration timer, inactivity timer, HARQ RTT timers, HARQ retransmission timers, etc.

In Embodiments II-5, in order to differentiate packet with different QoS related parameter, each packet in a logical channel is labelled with a corresponding QoS related parameter. In an embodiment of the present application, labelling the packet may include adding the corresponding QoS related parameter in the header of the packet. In another embodiment of the present application, labelling the packet may be achieved by UE's implementation, for example, by an internal singling in the UE.

After determining the one or more SL DRX configurations, in step 305, transmitting the SL data may further include: the MAC layer of the Tx UE obtains one or more packets of the SL data, wherein each of the one or more packets is labelled with a QoS related parameter; and the MAC layer of the Tx UE selects one or more LCHs during a LCP procedure, wherein each LCH of the one or more LCHs contains a packet, and wherein an SL DRX configuration associated with the packet of the one or more SL DRX configurations is in the active time.

Whether an SL DRX configuration associated with a packet is in the active time may be determined based on the QoS related parameter labelled for the packet. That is, since each packet is labelled with a QoS related parameter, in the case that an SL DRX configuration configured for a QoS related parameter is in the active time, it can be determined that an SL DRX configuration associated with a packet labelled with the QoS related parameter is in the active time.

The procedure for selecting one or more LCHs may be performed as follows: firstly, the Tx UE may select a LCH with the highest priority from all LCHs which contains packets whose associated SL DRX configurations are in the active time, and then the Tx UE may determine a L2 destination ID associated with the LCH based on a mapping relationship between the destination ID and one or more LCHs. After determining the L2 destination ID, the Tx UE may select one or more LCHs associated with the L2 destination ID which contain packets whose associated SL DRX configurations are in the active time. The SL DRX configuration being in active time may refer to that at least one SL DRX timer of a set of SL DRX timers of the SL DRX configuration is running (e.g. at least one of on-duration timer, inactivity timer, and HARQ retransmission timer is running) or the SL DRX configuration being in one or more time ranges or time periods defined as SL DRX active time.

The Rx UE may perform the same operation in step 304 as that performed by the Tx UE in step 303. That is, after receiving the plurality of SL DRX configurations configured based on QoS related parameter, in step 304, the RRC layer of the Rx UE may determine the one or more SL DRX configurations for the MAC layer, which includes: the RRC layer of the Rx UE may indicate a mapping relationship between QoS related parameter and SL DRX configuration to the MAC layer.

After receiving the mapping relationship between QoS related parameter and SL DRX configuration, for each QoS related parameter, the MAC layer of the Rx UE may maintain a set of SL DRX timers. In some embodiments of the present application, the set of SL DRX timers may include at least one of: on-duration timer, inactivity timer, HARQ RTT timers, HARQ retransmission timers, and any other timers as specified in 3GPP standard documents.

In step 306, the Rx UE may receive SL data based on active time derived in each of the one or more SL DRX configurations. In some embodiments of the present application, receiving the SL data may further include: monitoring SCI in the case that an SL DRX configuration associated with a QoS related parameter of the one or more SL DRX configurations is in the active time. The SL DRX configuration being in active time may refer to that at least one SL DRX timer of a set of SL DRX timers of the SL DRX configuration is running (e.g. at least one of on-duration timer, inactivity timer, and HARQ retransmission timer is running) or the DRX configuration being in one or more time ranges or time periods defined as SL DRX active time. In other words, the Rx UE will monitor SCI if at least one SL DRX timer of the set of SL DRX timers of the SL DRX configuration associated with the QoS related parameter is running, in an embodiment of the present application, the Rx UE will wake up to monitor SCI during active time of all of the one or more SL DRX configurations.

Embodiments III

According to some embodiments of the present application, the plurality of SL DRX configurations may be configured based on SLRB, RLC bearer, or LCH. That is, each SLRB, RLC bearer, or LCH may be associated with a SL DRX configuration of the plurality of SL DRX configurations. In Embodiments III, since a SLRB may be associated with a RUC bearer and a RLC bearer may be associated with a LCH, a SL DRX configuration configured for a SLRB may be seen as being configured for a RLC bearer or a LCH, and vice versa.

Embodiments III-1

In embodiments III-1, all of the plurality of SL DRX configurations may be used for the MAC layer of a UE a Tx UE or an Rx UE).

Consequently, for the Tx UE, determining the one or more SL DRX configurations for the MAC layer in step 303 may include: the MAC layer of the Tx UE determines the one or more SL DRX configurations for the MAC layer to be the plurality of SL DRX configurations. Each SLRB, RLC bearer, or LCH may be associated with a SL DRX configuration of the plurality of SL DRX configurations. Then, for each SLRB, RLC bearer, or LCH, the MAC layer of the Tx UE may maintain a set of SL DRX timers of a SL DRX configuration configured for the SLRB, RLC bearer, or LCH.

In some embodiments of the present application, the set of SL DRX timers may include at least one of: on-duration timer, inactivity timer, HARQ RTT timers, HARQ retransmission timers, and any other timers as specified in 3GPP standard documents.

For example, it is assumed that the plurality of SL DRX configurations include two SL DRX configurations (e.g., SL DRX configuration #1 and SL DRX configuration #2), wherein the SL DRX configuration #1 is configured for SLRB #1, RLC bearer #1, or LCH #1 and the SL DRX configuration #2 is configured for SLRB #2, RLC bearer #2, or LCH #2. After obtaining the two SL DRX configurations, the MAC layer of a UE (e.g., a Tx UE or the Rx UE) may determine the two SL DRX configurations for the MAC layer. For SLRB #1, RLC bearer #1, or LCH #1, the MAC layer of the UE may maintain a first set of SL DRX timers (including at least one of: on-duration timer, inactivity timer, HARQ RTT timers, HARQ retransmission timers, etc.). For SLRB #1, RLC bearer #1, or LCH #1, the MAC layer of the UE may maintain a second set of SL DRX timers (including at least one of: on-duration timer, inactivity timer, HARQ RTT timers, HARQ retransmission timers, etc.)

After determining the one or more SL DRX configurations, in step 305, transmitting the SL data may further include that: the MAC layer of the Tx UE selects one or more LCHs during a LCP procedure, wherein an SL DRX configuration associated with each LCH of the one or more LCHs is in the active time. The procedure for selecting one or more LCHs may be the same as that Embodiments II-1.

The Rx UE may perform the same operation in step 304 as that performed by the Tx UE in step 303. That is, the MAC layer of the Rx UE may determine the one or more SL DRX configurations for the MAC layer to be the plurality of SL DRX configurations. For each SLRB, RLC bearer, or LCH, the MAC layer of the Rx UE may maintain a set of SL DRX timers of a SL DRX configuration configured for the SLRB, RLC bearer, or LCH.

In step 306, the Rx UE may receive SL data based on the active time derived in each of the one or more SL DRX configurations. In some embodiments of the present application, receiving the SL data may further include: monitoring SCI in the case that an SL DRX configuration associated with a SLRB, RLC bearer, or a LCH of the one or more SL DRX configurations is in the active time. The SL DRX configuration being in active time may refer to that at least one SL DRX timer of a set of SL DRX timers of the SL DRX configuration is running or the SL DRX configuration being in one or more time ranges or time periods defined as SL DRX active time. In other words, the Rx UE will monitor SCI if at least one SL DRX timer of the set of SL DRX timers of the SL DRX configuration associated with the SLRB, RLC bearer, or a LCH is running. In an embodiment of the present application, the Rx UE will wake up to monitor SCI during active time of all of the one or more SL DRX configurations.

Embodiments II-2

In embodiments III-2, after receiving the plurality of SL DRX configurations configured based on SLRB, RLC bearer, or LCH, in step 303, the RRC layer of the Tx UE may determine the one or more SL DRX configurations for the MAC layer, which includes: for each L2 destination ID, the RRC layer of the Tx UE may determine (or derive) one SL DRX configuration from at least one SL DRX configuration associated with the corresponding L2 destination ID of the plurality of SL DRX configurations based on a pre-defined rule. The specific procedure may be as follows.

First, as stated in FIG. 2, at least one SLRB, RLC bearer, or LCH may be mapped to a L2 destination ID, and thus the RRC layer may determine that the at least one SL DRX configuration configured for the at least one SLRB, RLC bearer, or LCH may be used for the corresponding L2 destination ID. Consequently, for each L2 destination ID, the RRC layer may determine at least one SL DRX configuration.

After determining the at least one SL DRX for each L2 destination ID, the RRC layer of the Tx UE may further determine one SL DRX configuration from the at least one SL DRX configuration based on a predefined rule for each L2 destination ID. The pre-defined rule may define how to combine the at least one SL DRX configuration for each L2 destination ID or how to select one SL DRX configuration from the at least one SL DRX configuration for each L2 destination ID.

In an embodiment of the present application, the SL DRX configuration with minimum periodicity of the at least one SL DRX configuration may be derived as the final SL DRX configuration for a L2 destination ID. In another embodiment of the present application, a SL DRX cycle of a SL DRX configuration using the minimum periodicity of the at least one SL DRX configuration may be derived as the final SL DRX configuration for a L2 destination ID. In yet another embodiment of the present application, a SL DRX timer of a SL DRX configuration using the maximum value of the at least one SL DRX configuration may be derived as the final SL DRX configuration for a L2 destination ID. It is contemplated that any other pre-defined rule may also be used for determining the final SL DRX configuration for a L2 destination ID.

After determining the one SL DRX configuration for each L2 destination ID, the RRC layer may indicate the one SL DRX configuration for each L2 destination ID to the MAC layer. Then, for each L2 destination ID, the MAC layer of the Tx UE may maintain one set of SL DRX timers. In some embodiments of the present application, the set of SL DRX timers may include at least one of: on-duration timer, inactivity timer, HARQ RTT timers, HARQ retransmission timers, and any other timers as specified in 3GPP standard documents.

After determining the one or more SL DRX configurations, in step 305, transmitting the SL data may further include that: the MAC layer of the Tx UE selects a L2 destination ID during a LCP procedure, wherein an SL DRX configuration associated with the L2 destination ID of the one or more SL DRX configurations is in the active time. The procedure for selecting a L2 destination ID in Embodiments III-2 may be the same as that performed in Embodiments I.

The Rx UE may perform the same operation in step 304 as that performed by the Tx UE in step 303. That is, for each L2 destination ID, the RRC layer of the Rx UE may determine one SL DRX configuration from at least one SL DRX configuration of the plurality of SL DRX configurations associated with a corresponding L2 destination ID based on a pre-defined rule. The pre-defined rule used by the Rx UE may be the same as that used by the Tx UE.

After determining the one SL DRX configuration for each L2 destination ID, the RRC layer of the Rx UE may indicate the one SL DRX configuration for each L2 destination ID to the MAC layer of the Rx UE. Then, for each L2 destination ID, the MAC layer of the Rx UE may maintain one set of SL DRX timers. In some embodiments of the present application, the set of SL DRX timers may include at least one of: on-duration timer, inactivity timer, HARQ RTT timers, HARQ retransmission timers, and any other timers as specified in 3GPP standard documents.

In step 306, the Rx UE may receive SL data based on the active time derived in each of the one or more SL DRX configurations. In some embodiments of the present application, receiving the SL data may further include: monitoring SCI in the case that an SL DRX configuration associated with a L2 destination ID of the one or more SL DRX configurations is in the active time. The SL DRX configuration being in active time may refer to that at least one SL DRX timer of a set of SL DRX timers of the SL DRX configuration is running or the SL DRX configuration being in one or more time ranges or time periods defined as SL DRX active time. In other words, the Rx UE will monitor SCI if at least one SL DRX timer of the set of SL DRX timers of the SL DRX configuration associated with a L2 destination ID is running. In an embodiment of the present application, the Rx UE will wake up to monitor SCI during active time of all of the one or more SL DRX configurations.

Figure 4:
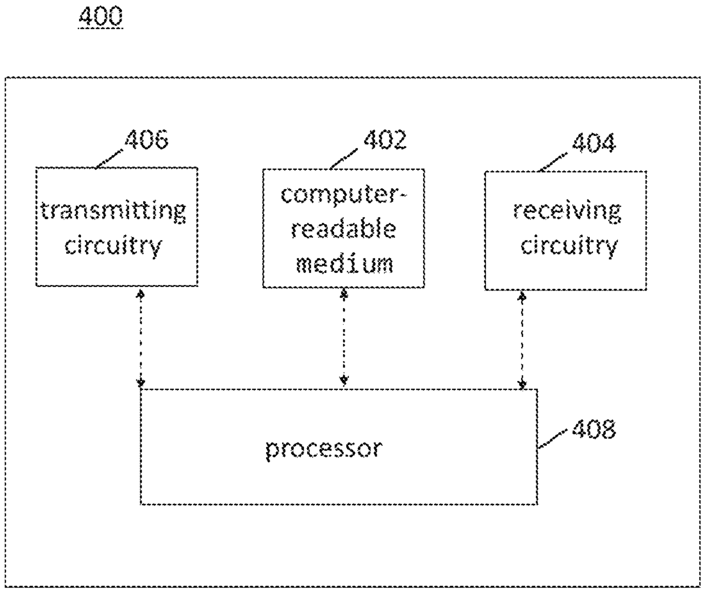
FIG. 4 illustrates a simplified block diagram of an exemplary apparatus for SL DRX configuration according to some embodiments of the present application.

FIG. 4 illustrates a simplified block diagram of an exemplary apparatus 400 for SL communication according to some embodiments of the present application. The apparatus 400 may include a UE (e.g., a Tx UE 102*a* or an Rx UE 102*b*) or a BS 101 as shown in FIG. 1.

Referring to FIG. 4, the apparatus 400 may include at least one non-transitory computer-readable medium 402, at least one receiving circuitry 404, at least one transmitting circuitry 406, and at least one processor 408. In some embodiments of the present application, the at least one receiving circuitry 404 and the at least one transmitting circuitry 406 can be integrated into at least one transceiver. The at least one non-transitory computer-readable medium 402 may have computer executable instructions stored therein. The at least one processor 408 may be coupled to the at least one non-transitory computer-readable medium 402, the at least one receiving circuitry 404 and the at least one transmitting circuitry 406. While shown to be coupled to each other via the at least one processor 408 in the example of FIG. 4, the at least one receiving circuitry 404, the at least one transmitting circuitry 406, the at least one non-transitory computer-readable medium 402, and the at least one processor 408 may be coupled to one another in various arrangements. For example, the at least one receiving circuitry 404, the at least one transmitting circuitry 406, the at least one non-transitory computer-readable medium 402, and the at least one processor 408 may be coupled to each other via, one or more local buses (not shown for simplicity). The computer executable instructions stored on the at least one non-transitory computer-readable medium 402 can be programmed to implement a method with the at least one receiving circuitry 404, the at least one transmitting circuitry 406 and the at least one processor 408. The method may include the operations or steps as shown in FIG. 3.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for SL communication, including a processor and a memory. Computer programmable instructions for implementing a method for SL communication are stored in the memory, and the processor is configured to perform the computer programmable instructions to implement the method for SL communication. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for SL communication as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skills in the art would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed:

1. A method performed by a user equipment (UE), the method comprising:

obtaining a plurality of sidelink (SL) discontinuous reception (DRX) configurations for SL communication, wherein the plurality of SL DRX configurations are configured based at least in part on a quality of service (QoS) related parameter;

obtaining, at a medium access control (MAC) layer of the UE from a higher layer of the UE, a mapping relationship between the QoS related parameter and at least one layer 2 (L2) destination identity (ID) associated with the MAC layer of the UE;

determining, at the MAC layer of the UE and based at least in part on the mapping relationship, one or more SL DRX configurations of the plurality of SL DRX configurations for the at least one L2 destination ID associated with the MAC layer of the UE; and transmitting SL data based at least in part on respective active times associated with the one or more SL DRX configurations.

2. The method of claim 1, wherein the one or more SL DRX configurations comprise the plurality of SL DRX configurations, and wherein transmitting the SL data comprises:

selecting, during a logical channel prioritization (LCP) procedure, an L2 destination ID associated with an SL DRX configuration of the one or more SL DRX configurations, wherein the SL DRX configuration is in at least one active time of the respective active times.

3. A user equipment (UE) for wireless communication, comprising:

at least one memory; and at least one processor coupled with the at least one memory and configured to cause the UE to:

obtain a plurality of sidelink (SL) discontinuous reception (DRX) configurations for SL communication, wherein the plurality of SL DRX configurations are configured based at least in part on a quality of service (QoS) related parameter;

obtain, at a medium access control (MAC) layer of the UE from a higher layer of the UE, a mapping relationship between the QoS related parameter and at least one layer 2 (L2) destination identity (ID) associated with the MAC layer of the UE;

determine, at the MAC layer of the UE and based at least in part on the mapping relationship, one or more SL DRX configurations of the plurality of SL DRX configurations for the at least one L2 destination ID associated with the MAC layer of the UE; and receive SL data based at least in part on respective active times associated with the one or more SL DRX configurations.

4. The UE of claim 3, wherein the one or more SL DRX configurations comprise the plurality of SL DRX configurations, wherein an L2 destination ID associated with an SL DRX configuration of the one or more SL DRX configurations is selected during a logical channel prioritization (LCP) procedure, and wherein the SL DRX configuration is in at least one active time of the respective active times.

5. The UE of claim 3, wherein to determine the one or more SL DRX configurations, the at least one processor is configured to cause the UE to:

determine, for respective logical channels of a plurality of logical channels and at a radio resource control (RRC) layer of the UE, at least one SL DRX configuration from the plurality of SL DRX configurations based at least in part on a first additional mapping relationship between the QoS related parameter and a sidelink radio bearer (SLRB) and a second additional mapping relationship between the SLRB and the respective logical channels.

6. The UE of claim 5, wherein the at least one processor is further configured to cause the UE to:

determine, for the respective logical channels and at the RRC layer, one SL DRX configuration from the at least one SL DRX configuration based at least in part on a pre-defined rule.

7. The UE of claim 3, wherein one or more logical channels are selected during a logical channel prioritization (LCP) procedure, and wherein respective SL DRX configurations associated with the one or more logical channels are in at least one active time of the respective active times.

8. The UE of claim 3, wherein the one or more SL DRX configurations are determined for respective L2 destination IDs of the at least one L2 destination ID at a radio resource control (RRC) layer of the UE.

9. The UE of claim 3, wherein the plurality of SL DRX configurations are configured based at least in part on one or more of a sidelink radio bearer (SLRB), a radio link control (RLC) bearer, or a logical channel (LCH), and wherein to determine the one or more SL DRX configurations, the at least one processor is configured to cause the UE to:

determine, at the MAC layer, the one or more SL DRX configurations to be the plurality of SL DRX configurations.

10. The UE of claim 9, wherein to determine the one or more SL DRX configurations, the at least one processor is configured to cause the UE to:

determine, for respective L2 destination IDs of the at least one L2 destination ID, one SL DRX configuration associated with the respective L2 destination IDs based at least in part on a pre-defined rule, wherein the plurality of SL DRX configurations comprise the one SL DRX configuration, wherein an L2 destination ID of the at least one L2 destination ID is selected during a logical channel prioritization (LCP) procedure, and wherein an SL DRX configuration associated with the L2 destination ID is in at least one active time of the respective active times.

11. A user equipment (UE) for wireless communication, comprising:

at least one memory; and at least one processor coupled with the at least one memory and configured to cause the UE to:

obtain a plurality of sidelink (SL) discontinuous reception (DRX) configurations for SL communication, wherein the plurality of SL DRX configurations are configured based at least in part on a quality of service (QoS) related parameter;

obtain, at a medium access control (MAC) layer of the UE from a higher layer of the UE, a mapping relationship between the QoS related parameter and at least one layer 2 (L2) destination identity (ID) associated with the MAC layer of the UE;

determine, at the MAC layer of the UE and based at least in part on the mapping relationship, one or more SL DRX configurations of the plurality of SL DRX configurations for the at least one L2 destination ID associated with the MAC layer of the UE; and transmit SL data based at least in part on respective active times associated with the one or more SL DRX configurations.

12. The UE of claim 11, wherein the one or more SL DRX configurations comprise the plurality of SL DRX configurations, and wherein to transmit the SL data, the at least one processor is configured to cause the UE to:

select, during a logical channel prioritization (LCP) procedure, an L2 destination ID associated with an SL DRX configuration of the one or more SL DRX configurations, wherein the SL DRX configuration is in at least one active time of the respective active times.

13. The UE of claim 11, wherein to determine the one or more SL DRX configurations, the at least one processor is configured to cause the UE to:

determine, for respective logical channels of a plurality of logical channels and at a radio resource control (RRC) layer of the UE, at least one SL DRX configuration from the plurality of SL DRX configurations based at least in part on a first additional mapping relationship between the QoS related parameter and a sidelink radio bearer (SLRB) and a second additional mapping relationship between the SLRB and the respective logical channels.

14. The UE of claim 13, wherein the at least one processor is further configured to cause the UE to:

determine, for the respective logical channels and at the RRC layer, one SL DRX configuration from the at least one SL DRX configuration based at least in part on a pre-defined rule.

15. The UE of claim 11, wherein to transmit the SL data, the at least one processor is configured to cause the UE to:

select one or more logical channels during a logical channel prioritization (LCP) procedure, wherein respective SL DRX configurations associated with the one or more logical channels are in at least one active time of the respective active times.

16. The UE of claim 11, wherein the one or more SL DRX configurations are determined for respective L2 destination IDs of the at least one L2 destination ID at a radio resource control (RRC) layer of the UE.

17. The UE of claim 16, wherein the one or more SL DRX configurations are based at least in part on a pre-defined rule.

18. The UE of claim 11, wherein the plurality of SL DRX configurations are configured based at least in part on one or more of a sidelink radio bearer (SLRB), a radio link control (RLC) bearer, or a logical channel (LCH), and wherein to determine the one or more SL DRX configurations, the at least one processor is configured to cause the UE to:

determine, at the MAC layer, the one or more SL DRX configurations to be the plurality of SL DRX configurations.

19. The UE of claim 18, wherein to determine the one or more SL DRX configurations, the at least one processor is configured to cause the UE to:

determine, for respective L2 destination IDs of the at least one L2 destination ID, one SL DRX configuration associated with the respective L2 destination IDs based at least in part on a pre-defined rule, wherein the plurality of SL DRX configurations comprise the one SL DRX configuration; and select an L2 destination ID of the at least one L2 destination ID during a logical channel prioritization (LCP) procedure, wherein an SL DRX configuration associated with the L2 destination ID is in at least one active time of the respective active times.

20. A method performed by a user equipment (UE), the method comprising:

obtaining a plurality of sidelink (SL) discontinuous reception (DRX) configurations for SL communication, wherein the plurality of SL DRX configurations are configured based at least in part on a quality of service (QoS) related parameter;

obtaining, at a medium access control (MAC) layer of the UE from a higher layer of the UE, a mapping relationship between the QoS related parameter and at least one layer 2 (L2) destination identity (ID) associated with the MAC layer of the UE;

determining, at the MAC layer of the UE and based at least in part on the mapping relationship, one or more SL DRX configurations of the plurality of SL DRX configurations for the at least one L2 destination ID associated with the MAC layer of the UE; and receiving SL data based at least in part on respective active times associated with the one or more SL DRX configurations.

* * * * *